United States Patent [19]
Suzuki et al.

[11] Patent Number: 5,847,485
[45] Date of Patent: *Dec. 8, 1998

[54] MOTOR STRUCTURE

[75] Inventors: Yuzuru Suzuki, Shizuoka-ken; Sakae Fujitani, Hamakita, both of Japan

[73] Assignee: Minebea Co., Ltd., Nagano-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 749,343

[22] Filed: Nov. 21, 1996

[30] Foreign Application Priority Data

Jan. 30, 1996 [JP] Japan ................... 8-034170

[51] Int. Cl.$^6$ .................................................. H02K 19/00
[52] U.S. Cl. ...................... 310/257; 310/49 R; 310/89; 360/99.08
[58] Field of Search .................. 310/257, 49 R, 310/89; 360/99.08, 98.07, 104, 105, 106, 107, 108

[56] References Cited

U.S. PATENT DOCUMENTS

| | | | |
|---|---|---|---|
| 2,901,654 | 8/1959 | Myers | 313/113 |
| 3,310,696 | 3/1967 | Jullien-Davin | 310/164 |
| 3,414,751 | 12/1968 | Bossard | 310/164 |
| 3,475,630 | 10/1969 | Heinzen et al. | 310/43 |
| 4,059,780 | 11/1977 | Mazuir | 310/164 |
| 4,241,270 | 12/1980 | Haydon et al. | 310/164 |
| 4,623,809 | 11/1986 | Westley | 310/49 R |
| 4,656,381 | 4/1987 | Komatsu | 310/257 |
| 4,714,850 | 12/1987 | Akiba et al. | 310/49 R |
| 4,794,292 | 12/1988 | Torisawa | 310/257 |
| 4,858,047 | 8/1989 | Cannon et al. | 360/106 |
| 4,990,806 | 2/1991 | Kikuchi et al. | 310/49 A |
| 5,020,211 | 6/1991 | Nakagawa et al. | 310/45 |
| 5,303,104 | 4/1994 | Aruga et al. | 360/106 |

FOREIGN PATENT DOCUMENTS

| | | | |
|---|---|---|---|
| 62-37051 | 2/1987 | Japan | 310/49 R |
| 62-250856 | 10/1987 | Japan | 310/49 R |
| 4-133654 | 5/1992 | Japan | 310/49 R |

OTHER PUBLICATIONS

Database WPI, Derwent Publications Ltd., London, GB; AN 95–190027 XP002030218 & JP 07 107 731 A (Sony Corp.) 21 Apr., 1995–Abstract; Figures 3,6,8*.

Patent Abstracts of Japan, vol. 096, No. 005, 31 May, 1996 & JP 08 009620 A (Nippodenso Co. Ltd.), 12 Jan., 1996 *Abstract; Figure 1*.

Patent Abstracts of Japan, vol. 004, No. 189 (E–039), 25 Dec., 1980 & JP 55 131264 (Fuji Electrochem. Co. Ltd.), 11 Oct., 1980 –*Abstract; Figures 3, 6*.

Patent Abstracts of Japan, vol. 012, No. 367 (E–664), 30 Sep., 1988 & JP 63 17653 A (Seiko Epson Corp.), 21 May, 1988 –*Abstract*.

T. Kenjo; "Stepping Motors and Their Microprocessor Controls"; 1986 (reprint); pp. 40–45; Oxford University Press.

*Primary Examiner*—Nestor Ramirez
*Assistant Examiner*—Burton S. Mullins
*Attorney, Agent, or Firm*—Frishauf, Holtz, Goodman, Langer & Chick

[57] ABSTRACT

A motor structure of a claw pole type two-phase synchronous motor has a stator including two armature coils held between corresponding pairs of stator yokes and superposed on one another, and a rotor coaxially mounted on the stator and having a rotary shaft around which the rotor rotates so that a part of the chassis of a memory apparatus forms one of the stator yokes.

4 Claims, 5 Drawing Sheets

TO THE CENTER OF
MAGNETIC HEAD 3

TO THE CENTER OF
MAGNETIC HEAD 3

MOTOR STRUCTURE

BACKGROUND OF THE INVENTION

1. Technical Field of the Invention

The present invention relates to a motor structure and more particularly to a claw pole type two phase synchronous motor which can be used as a spindle motor in a memory apparatus such as an FDD (floppy disc drive apparatus), an HDD (hard disc drive apparatus) or a CD-ROM (compact disc ROM apparatus), all of which are referred to hereinafter as a "memory apparatus".

2. Description of the Related Art

Since a memory apparatus such as an FDD, an HDD or a CD-ROM must be rotated very accurately, a three phase brushless DC motor which rotates at a high accuracy has been used as a spindle motor of such a memory apparatus. However, this DC motor cannot be manufactured at a low cost, and thus it is undesirable to be used in the memory apparatus because the manufacturing cost of a memory apparatus must be reduced.

A claw pole type two-phase synchronous motor can be speed-controlled in an open loop control system, making the use of a magnetic switching sensor unnecessary, whereby the structure of this motor can be simplified and its cost can be reduced. However, this motor is basically a stepping motor which has the disadvantages that large cogging, torque ripple, oscillation, noise and magnetic flux leakage are produced. Thus, the conventional claw pole type two-phase synchronous motor could not be used as a spindle motor for a memory apparatus.

The conventional synchronous motor is manufactured separately from the chassis of a memory apparatus. Even when the spindle motor is assembled into the memory apparatus by using a jig, the center of rotation of the motor may be slightly displaced from the predetermined mounted position of the magnetic head of the memory apparatus, resulting in misalignment between the spindle of the motor and the head.

A claw pole type two-phase synchronous motor which is operated at low cogging and small torque ripple is disclosed in U.S. patent application Ser. No. 08/662,448 filed on Jun. 10, 1996 assigned to the same assignee as the present application, the entire contents of which are incorporated herein by reference.

SUMMARY OF THE INVENTION

The object of the present invention is to provide a claw pole type two-phase synchronous motor which can be manufactured at a low cost by reducing the number of components and improving yield, which operates stably at a high accuracy attained by increasing the assembling accuracy of the motor into a memory apparatus, and which can be used as a spindle motor of the memory apparatus.

In order to achieve the object, a motor structure according to the present invention comprises a rotor and a stator disposed coaxially with the rotor. The stator comprises stator yokes made from a soft magnetic steel plate and superposed on one after another and armature coils each held in the corresponding pairs of the stator yokes. The rotor comprises a permanent magnet. Pole teeth are formed on a peripheral surface of each of the stator yokes by bending parts of the corresponding plate at substantially right angles with respect to the plate and are arranged opposed to the permanent magnet with a predetermined gap interposed between the pole teeth and the permanent magnet. Lead-out lines are drawn from the armature coils. The synchronous motor according to the present invention has the specific feature that a part of the chassis of a memory apparatus forms one of the stator yokes.

DETAILED DESCRIPTION OF THE PREFERRED EMBODIMENTS

The present invention will be described in detail by way of preferred embodiments with reference to the accompanying drawings.

In the embodiments of the present invention described hereinbelow, claw pole type two-phase synchronous motors are used as spindle motors. Thus, these motors are described as claw pole spindle motors.

Figure 1:
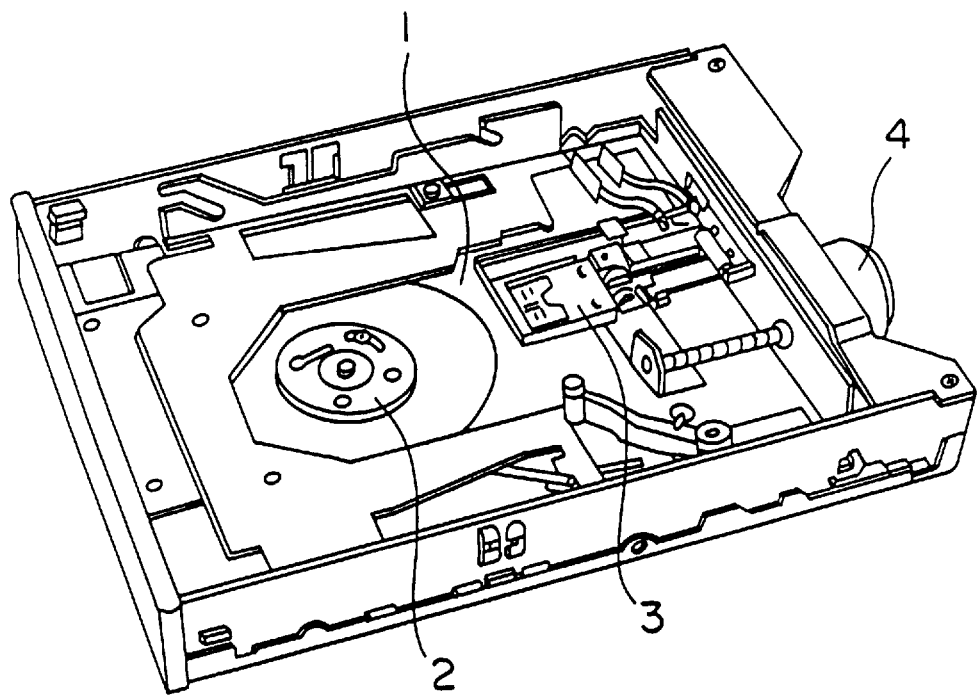
FIG. 1 is a perspective view of a floppy disc drive apparatus in which a spindle motor according to the present invention is mounted.

As shown in FIG. 1, a floppy disc drive apparatus comprises a chassis 1 made of soft magnetic steel, a claw pole spindle motor 2, a magnetic head 3 and a stepping motor 4 for driving a head actuator. The chassis 1 has a circular depressed mount which is formed by a drawing process as will be described later and in which the claw pole spindle motor 2 is mounted. Lead-out lines (not shown in FIG. 1) are drawn out from the claw pole spindle motor 2 as will be described later.

Figure 2:
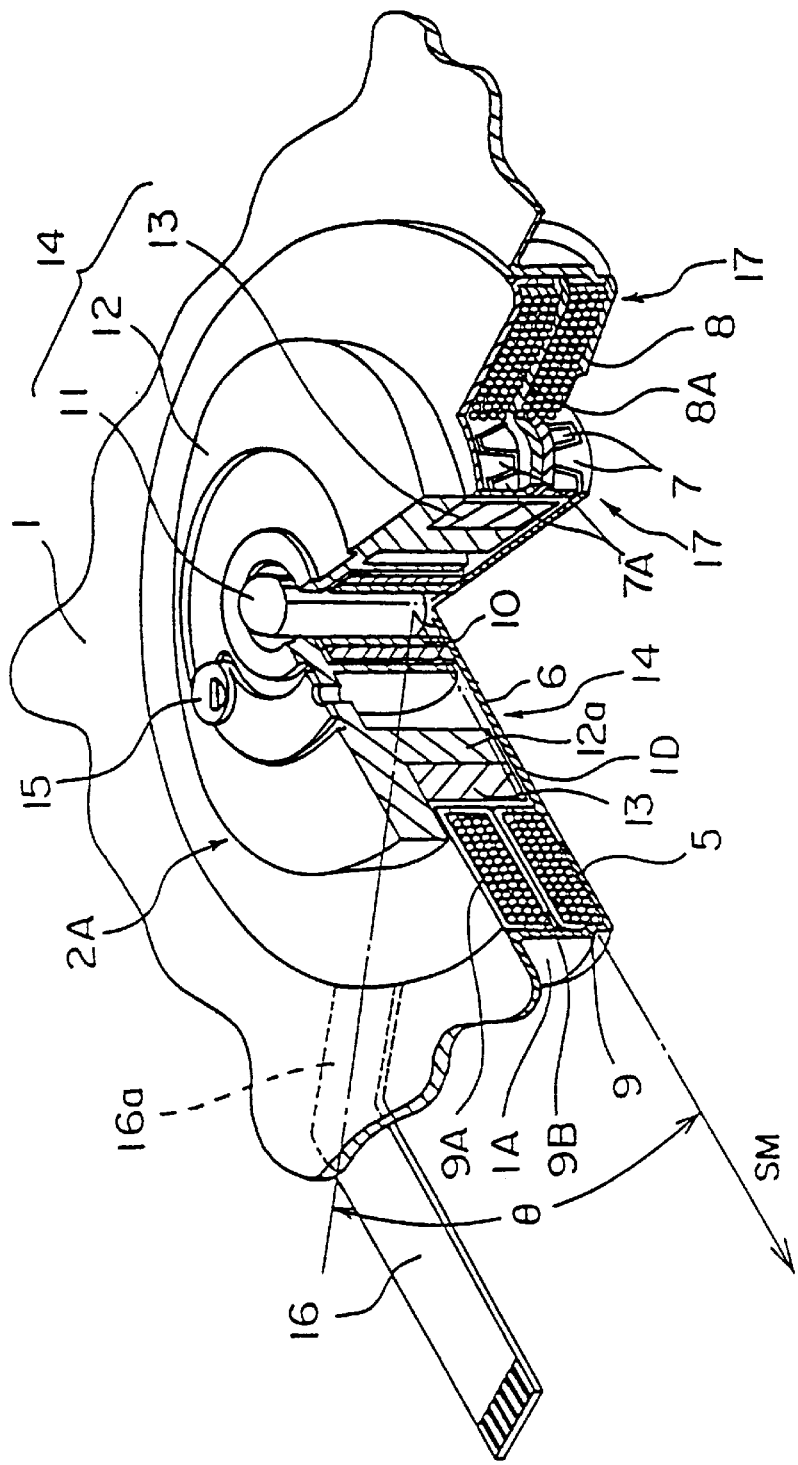
FIG. 2 is a perspective view of a first embodiment of the claw pole spindle motor according to the present invention, with the main portion cross-sectioned.
Figure 3:
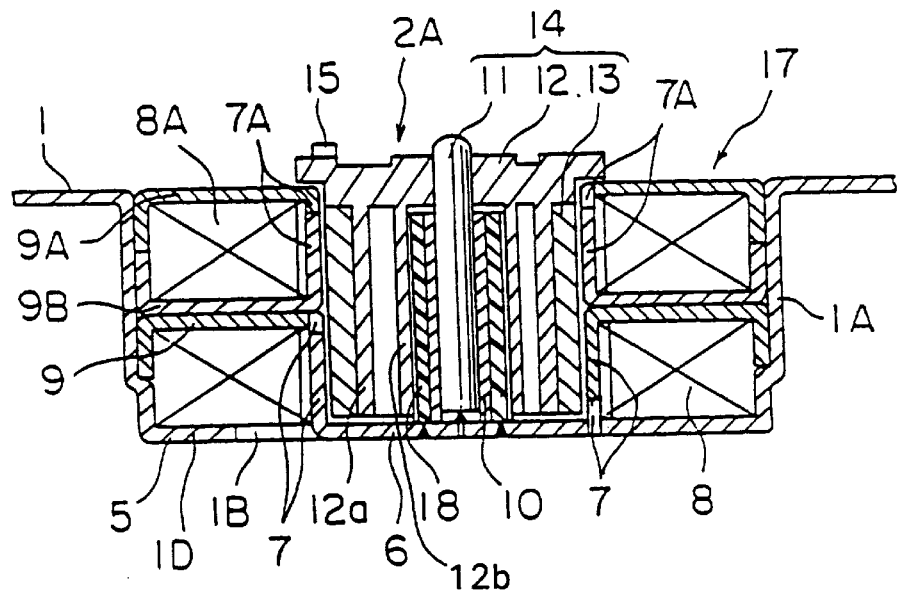
FIG. 3 is an axial cross-sectional view of the claw pole spindle motor. shown in FIG. 2.

FIGS. 2 and 3 show a first embodiment of the spindle motor according to the present invention. A cylindrical mount 1A is formed in the chassis 1 of the floppy disc drive apparatus by a drawing process. The circular bottom portion 1D of the circular depressed mount 1A comprises a circular flange 6 formed at the central portion of the base portion 1D, for supporting a cylindrical oil-retaining bearing 10 and a stator yoke 5 (referred to hereinafter as the "lower stator yoke 5") formed around the flange 6.

Circularly arranged and preferably equidistantly spaced trapezoidal portions 1B are punched out from the annular zone of the stator yoke 5 so that their roots or bases are on the inner circular edge of the stator yoke 5, and they extend radially outward. The number of the trapezoidal portions 1B is twenty-four in this embodiment but any number can be selected if required. The trapezoidal portions 1B are bent at their roots upward substantially at right angles with respect to the bottom portion 1D to form pole teeth 7 which are twenty-four in number in this embodiment and which are arranged circularly preferably at substantially equal intervals.

The part of the annular zone other than the pole teeth 7 is used to connect the stator yoke 5 to the flange 6. It should be noted that the depressed mount 1A is not necessarily truly cylindrical but may has another shape as long as it can be used properly. A first armature coil 8 is inserted in the stator yoke 5 from above.

A stator yoke 9 (referred to hereinafter as the "upper stator yoke 9") made of soft magnetic steel has the same number, the same size and the same arrangement of pole teeth 7 which are formed similarly to the lower stator yoke 5. The upper stator yoke 9 is placed from above on the first armature coil 8 held in the lower stator yoke 5, with the pole tooth 7 of both stator yokes 5 and 9 interdigitated preferably at substantially equal circumferential intervals. In this way, the first armature coil 8 is mounted in the depressed mount 1A in a state held between the upper and lower stator yokes 9 and 5. Here, the first armature coil 8, the upper and lower stator yokes 9 and 5 and the pole teeth 7 constitute a first armature coil assembly.

Another upper stator yoke 9A and another lower stator yoke 9B both made of soft magnetic steel and having pole teeth 7A are formed in the same way as the upper stator yoke 9. A second armature coil 8A is held between the upper and lower stator yokes 9A and 9B with the pole teeth 7A interdigitated preferably at substantially equal circumferential intervals. The second armature coil 8A and the upper and lower stator yokes 9A and 9B and the pole teeth 7A constitute a second armature coil assembly. The second armature coil assembly is inserted in the depressed mount 1A from the above to be placed on the first armature coil assembly.

One of the first and second armature coil assemblies is set in phase A and the other one is set in phase B. These armature coil assemblies are arranged so that the phase difference between the assemblies is 80° to 90° in an electric angle.

Lead-out lines 16 are drawn out from the armature coils 8 and 8A, and the drawn-out portion 16a of the led-out lines 16 makes an angle θ with a straight line SM passing the central axis of the claw pole spindle motor 2A and the center of the magnetic head 3, the angle θ being measured from the portion of the line SM as viewed from the magnetic head 3 (see FIG. 2). The angle θ is ±30° to ±135° (preferably, ±30° to ±90°) so that the magnetic fluxes leaking from the claw pole spindle motor 2A does not disadvantageously affect the performance of the magnetic head 3 and the drawn-out portion 16a is made the shortest.

As shown in FIG. 3, a cylindrical oil-retaining bearing 10 is placed in the central portions of the stator yokes 5 and 9, and 9A and 9B and fixed at the lower end thereof to the flange 6, i.e., the central part of the bottom portion 1D of the annular depressed mount 1A by means of a portion 18 which is formed by molding a polymeric material on the outer peripheral surface of the bearing 10. The stator yokes 5, 9, 9A and 9B are fixed at the outer peripheral surfaces thereof to the cylindrical wall of the annular depressed mount 1A. These yokes are also fixed to the corresponding armature coils by means of a polymeric material. In this way, a stator 17 comprising both armature coil assemblies is formed. However, the yokes can be fixed together by means of plasma welding, caulking or the other suitable way.

A disc-like hub 12 is made of a plastic magnetic material. A cylindrical rotor magnet receiving portion 12a is also made of a plastic magnetic material and is integrally and coaxially formed on the hub 12 so as to extend downward from the undersurface of the hub 12. A rotor magnet 13 is fixedly mounted on the outer peripheral surface of the rotor magnet receiving portion 12a. Interior of the rotor magnet receiving portion 12a, an inner cylindrical portion is coaxially formed 12b with its upper end integrally fixed to the undersurface of the hub 12.

Eight magnetic poles for attracting a disc hub are formed on the hub surface of the hub 12, and forty-eight magnetic poles working as field magnets are formed on the rotor magnet 13.

A rotary shaft 11 has an upper end portion extending through the central portion of the body of the hub 12 and fixed thereto. The rotary shaft 11 extends through the inner cylindrical portion 12b.

The rotary shaft 11, the hub 12 and the rotor magnet 13 constitute a rotor 14. A drive pin 15 is formed on the upper surface of the hub 12 to transmit the rotation of the rotor 14 to an external rotary device.

The rotary shaft 11 is inserted in the bearing 10 surrounded by a molded portion 18 in a state in which the inner cylindrical portion 12b receives the bearing 10 with a small gap provided between the inner peripheral surface of the portion 12b and the outer peripheral surface of the molded portion 18. Thus, the rotor 14 is securely mounted in the stator 17. In this way, the claw pole spindle motor 2A is manufactured.

With the conventional spindle motor which does not contain, as an element, the chassis of a floppy disc drive apparatus, fine adjustment is required to set the spindle motor on the chassis in a correct position.

In contrast, the claw pole spindle motor 2A according to this embodiment of the present invention uses, as an element thereof, a part of the chassis 1 of a floppy disc drive apparatus. Thus, accurate positioning of the spindle motor 2A on the chassis 1 is ensured without necessity of adjustment which must be made in the conventional spindle motor. This improves the operational stability of the claw pole spindle motor 2A and reduces the number of parts to lower the cost of the memory apparatus. Further, the depressed mount 1A is formed by a drawing process, whereby the strength of the chassis 1 is enhanced. Thus, the spindle motor 2A of this embodiment can be used as a drive apparatus in a severe environment.

Figure 4:
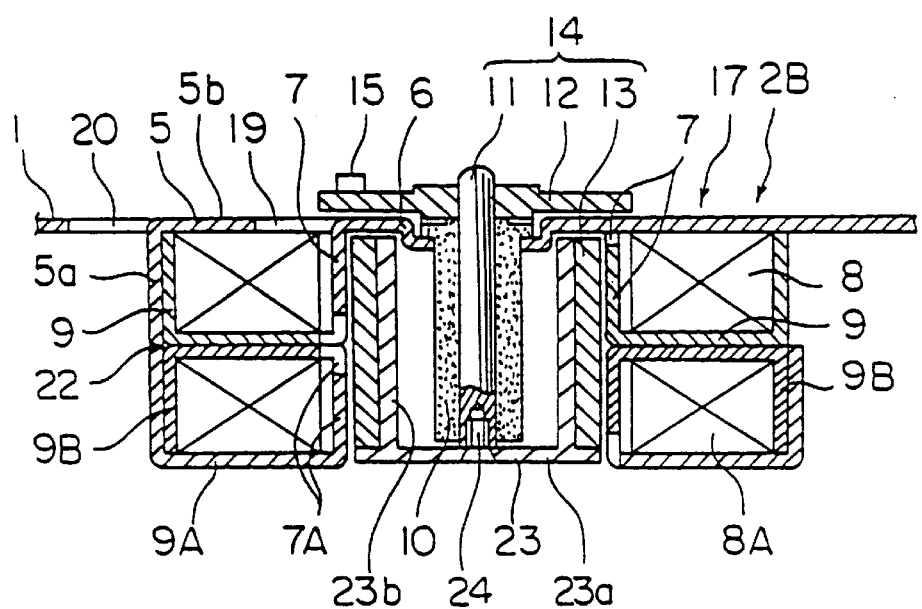
FIG. 4 is an axial cross-sectional view of a second embodiment of the claw pole spindle motor according to the present invention, taken along line X—X of FIG. 5.
Figure 5:
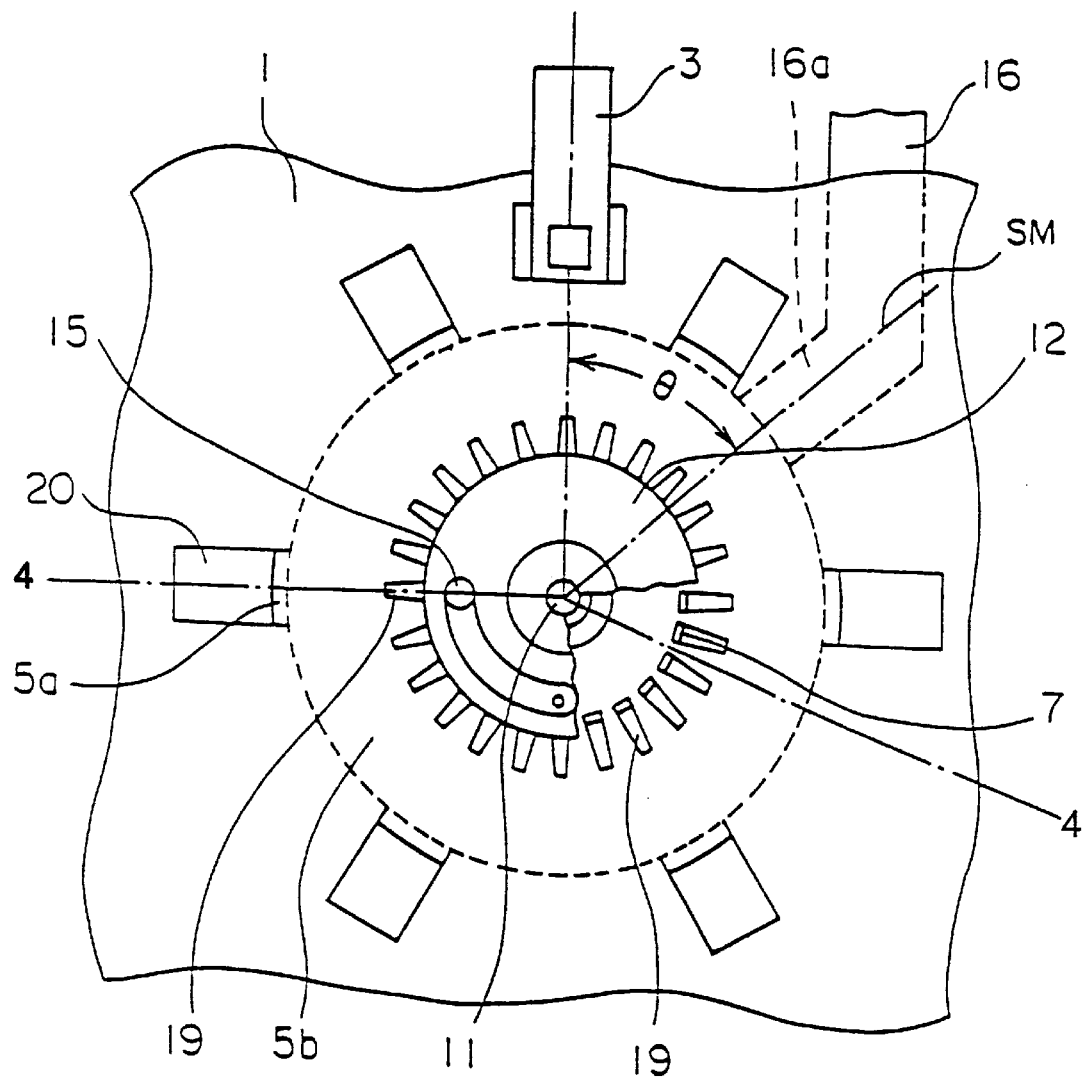
FIG. 5 is a plan view of the claw pole spindle motor shown in FIG. 4.

In FIGS. 4 and 5 show a second embodiment of the claw pole spindle motor 2B according to the present invention. The motor 2B comprises a stator 17 and a rotor 14 coaxially mounted in the stator 17. The stator 17 has a first armature coil 8, a second armature coil 8A disposed under the first armature coil 8. However, the motor 2B does not have a cylindrical depressed mount 1A unlike the claw pole spindle motor 2A according to the first embodiment. The chassis 1 has a circular flange 6 and an annular zone 5b around the flange 6.

Referring to FIG. 5, trapezoidal portions 19 circularly arranged preferably at substantially equal intervals are punched out from the annular zone 5b of a flat chassis 1 which zone is to be placed over the first armature coil 8 after the assembly of the first and second armature coils 8 and 8A has been completed.

Each trapezoidal portion 19 radially outwardly extends by a length equal to the height of pole teeth 7 to be formed from a phantom circle having a diameter slightly (0.3 mm, for example) larger than the outer diameter of a rotor magnet 13. The trapezoidal portions 19 are bent downward substantially at right angles to form the pole teeth 7 arranged circularly preferably at substantially equal intervals. The number of the pole teeth 7 formed from the chassis 1 may be twenty-four or another suitable number.

Rectangular portions 20 arranged circularly preferably at substantially equal intervals are punched out from annular zone of the chassis 1. Each rectangular portion radially outwardly extends from a phantom circle defined by the roots of the rectangular portions 20 by a length equal to the height of a stator yoke 9 as will be described later. The rectangular portions 20 are bent downward at substantially right angles to form comb-shaped outer peripheral portions 5a. The annular zone 5b, the teeth 7 and the outer peripheral portions 5a constitute an upper stator yoke 5.

As shown in FIG. 4, a lower cylindrical stator yoke 9 for the first armature coil 8 comprises a ring-shaped bottom portion (horizontal portion), pole teeth 7 formed on the inner circular edge of the stator yoke 9 and an outer peripheral portions formed on the outer circular edge of the lower stator yoke 9. The pole teeth 7 have the same shape, size and the number and the arrangement of the teeth 7 of the chassis 1 and bent upward at substantially right angles with respect to the bottom portion of the lower stator yoke 9.

The first armature coil 8 is placed in the lower stator yoke 9, and then the lower stator yoke 9 is fixed to the upper stator yoke from below by means of a polymeric material, with the pole teeth 7 of the upper and lower stator yokes interdigitated preferably at substantially equal intervals. The upper and lower stator yokes and the first armature coil 8 are connected together by means of a polymeric material or any other suitable means and constitute a first armature assembly.

The second armature coil 8A is held between a cylindrical upper stator yoke 9B and a lower cylindrical stator yoke 9A having the same shape, size as the lower stator yoke 9 for the first armature assembly 8 in a state in which the upper stator yoke 9B is disposed upside down. In other words, each of them has a ring-shaped horizontal portion provided on the inner circular edge of the horizontal portion with pole teeth 7A and on the outer circular edge of the horizontal portion with a cylindrical outer peripheral wall.

The horizontal portion, the teeth 7A and the outer peripheral wall also constitute a lower stator yoke 9A for the second armature coil 8A. The upper and lower stator yokes 9 and 9A and the second armature coil 8A are connected together by means of a polymeric material or any other suitable means and constitute a second armature coil assembly. The first and second armature coil assemblies are fixed together by means of welding shown at 22.

A cylindrical oil-retaining bearing 10 has an upper end portion passing through and fixed to the central portion of the flange 6, and extends downward from the flange 6.

A rotary shaft 11 has an upper end passing through and fixed to the central portion hub 12. The rotary shaft 11 fixed to the hub 12 is inserted, and a cup-shaped rotor magnet receiving member 23 having a circular bottom portion 23a and a cylindrical outer peripheral wall 23b on which a rotor magnet 13 is mounted is inserted in a circular columnar space in the stator 17. The central portion of the bottom portion 23a of the rotor receiving member 23 is fixed at its disc-like bottom portion 23a to the lower end of the rotor shaft 11 by means of a screw 24, with a predetermined gap disposed between the pole teeth 7 and 7A and the rotor magnet 13. The rotary shaft 11, the hub 12, the rotor magnet receiving member 23 and the rotor magnet 13 constitute a rotor 14.

The hub 12, the rotary shaft 11, the rotor receiving member 23 and the rotor magnet 13 constitute a rotor 14 and the upper surface of the hub 12 is formed a pin 15 for transmitting the rotation of the rotor 14 to an external rotary device. The other elements and the parts are the same as those of the first embodiment and are indicated in FIG. 5 by the same reference numerals as those of the first embodiment, and a detailed description thereof is omitted.

Figure 6:
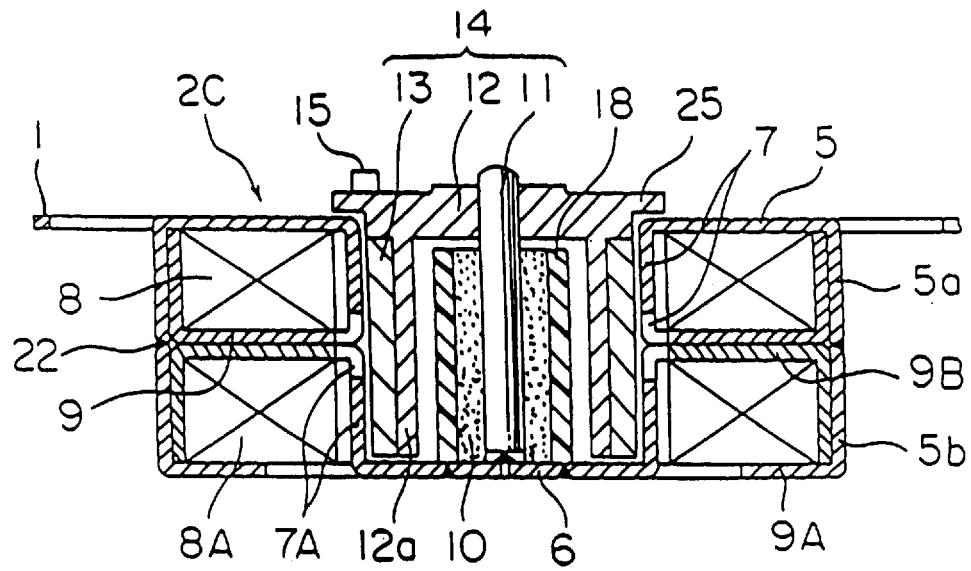
FIG. 6 is an axial cross-sectional view of a third embodiment of the claw pole spindle motor according to the present invention.

FIG. 6 shows a third embodiment of the claw pole spindle motor 2C which has a first armature coil assembly including a first armature coil 8 and a second armature coil assembly including a second armature coil 8A and disposed under the first armature coil assembly. The elements and parts other than those described below are the same as those described in the first and second embodiments. Thus, they are shown in FIG. 6 by the same reference numerals as those of the first and second embodiments and a detailed description thereof is omitted.

A gear-shaped portion is punched out from the chassis 1 of a memory device. The remaining portions between the teeth of the punched-out gear-shaped portions extend radially inward and are shaped as pole teeth 7 to be formed. These remaining portions are bent downward at their roots at substantially right angles to be formed into pole teeth 7. Comb-shaped outer peripheral portions 5a are formed in the same way as in the second embodiment. The pole teeth 7, the comb-shaped outer peripheral portions 5a and the annular portion of the chassis 1 defined therebetween constitute an upper stator yoke 5 for the first armature coil 8. The upper stator yoke 5, a lower stator yoke 9 having the same structure as that of the first embodiment and a first armature coil 8 held by both stator yokes 5 and 9 constitute a first armature coil assembly.

Around a circular flange 6 there is integrally formed a lower stator yoke 9A having trapezoidal pole teeth 7A formed at its inner circular edge and comb-shaped outer peripheral portions 5b formed at its outer circular edge.

The pole teeth 7A are formed by bending the trapezoidal portions in an annular zone of the lower stator yoke 9A which extend radially outwardly from the inner circular edge of the lower stator pole 9A. The lower stator yoke 9A, an upper stator yoke 9B having the same structure as that of the second embodiment and a second armature coil 8A held between both stator yokes constitute a second armature coil assembly.

The lower end of the cylindrical oil-retaining bearing 10 is fixed to the central portion of the flange 6 by means of a molded portion 18 formed on the outer peripheral surface of the bearing 10 in the same way as in the first embodiment. A rotary shaft 11 extends through the bearing 10 and is rotatably supported at its lower end on the flange 6.

Figure 7:
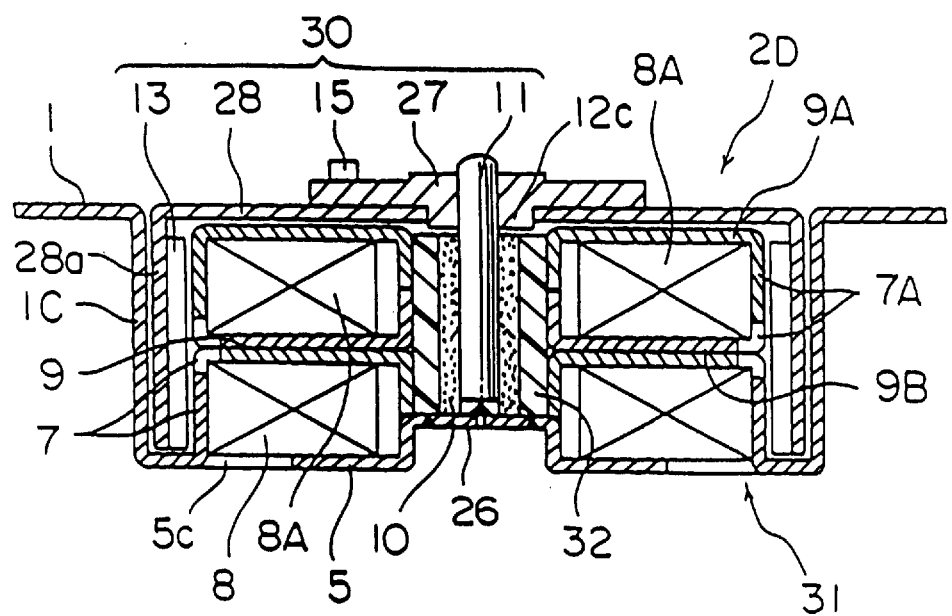
FIG. 7 is an axial cross-sectional view of a fourth embodiment of the claw pole spindle motor according to the present invention.

FIG. 7 shows a fourth embodiment of the claw pole spindle motor 2D. The spindle motors 2A to 2C of the first to third embodiments are of an inner rotor type and the spindle motor 2D of the fourth embodiment is of an outer rotor type.

A cylindrical depressed mount 1C is formed in the chassis 1 of a memory apparatus. The central portion of the circular bottom portion of the mount 1C is elevated to form a circular flange 26.

The lower end of a cylindrical oil-retaining bearing 10 is fixed to the flange 26. The part of the bottom portion 5 except for the flange 26 forms a lower stator yoke.

Circularly and preferably equidistantly arranged trapezoidal portions are punched out from an annular zone of the bottom portion 5 which is close to the outer circular edge thereof. The trapezoidal portions are bent upward at substantially right angles at their outer ends to form pole teeth 7. A first armature coil 8 is placed in the lower stator yoke formed by the bottom portion 5.

An upper stator yoke 9 having downward extending pole teeth 7 formed on its outer edge and an inner wall formed at its inner edge is disposed on the first armature coil 8. The pole teeth 7 of the upper and lower stator yokes are interdigitated preferably at substantially equal intervals. These two stator yokes and the first armature yoke 8 held by them constitute a first armature coil assembly.

On the first armature coil assembly there is coaxially and fixedly placed a second armature coil assembly comprising two stator yokes 9A, 9B having trapezoidal pole teeth 7A arranged circumferentially preferably at substantially equal intervals and inner walls formed on the inner edges of the stator yokes 9A, 9B, and a second armature coil 8A held between the stator yokes 9A, 9B. The inner walls of the first and second armature coil assemblies are firmly connected to the bearing 10 by means of a cylindrical molded portion 32. The first and second armature assemblies constitute a stator 31.

A disk-shaped hub 27 is formed on its central portion with a disk-shaped hub portion 12c. The central portion of a cup-shaped rotor yoke 28 is fixed to the hub portion 12c of the hub 27. On the inner surface of the cylindrical outer peripheral wall portion or a skirt portion 28a of the rotor yoke 28 there is provided a cylindrical rotor magnet 13.

The upper end portion of a rotary shaft 11 is inserted in the central portion of the hub 27 and fixed thereto. The hub 27, the rotary shaft 13, the rotor yoke 28 and the rotor magnet 13 constitute a rotor 30. On the upper surface of the hub 27 there is provided a drive pin 15 for transmitting the rotation of the rotor 30 to an external rotary apparatus.

The rotor 30 is assembled into the stator 31 by inserting the rotary shaft 11 in the bearing 10 and as well as inserting the outer peripheral wall portion 28a of the rotor yoke 28 in the space between the pole teeth 7 and 7A and the outer peripheral wall 1C of the depressed mount 1C. In this state, the rotor magnet 13 is located in the space between the pole teeth 7 and 7A. In this way, the claw pole spindle motor 2D is manufactured.

The number of phases of the motor according to the present invention is not limited to two, and motors having more than two phases are available. In such motors, yoke coil assemblies, the number of which is equal to the number of the phases thereof and each of which comprises a pair of yokes and an armature coil held therebetween, are superposed on one another.

What is claimed is:

1. A claw pole type synchronous motor used for driving a memory apparatus, said motor comprising:

(a) a memory apparatus chassis having a depressed mount and a flange, said depressed mount and said flange being integrally formed with said chassis as a single piece, said depressed mount having a circular bottom, and said flange being provided coaxially with and in said depressed mount;

(b) a rotor including a permanent magnet and a shaft to which said permanent magnet is coaxially fixed, said shaft being rotatably mounted on said circular bottom of said depressed portion;

(c) a rotor bearing fixed to said flange of said chassis for supporting said rotor; and (d) a stator disposed coaxially with said rotor, said stator including:

(i) at least two pairs of stator yokes superposed on one another, said stator yokes being made from a soft magnetic steel plate and each of said stator yokes having a circular edge with pole teeth formed thereon, said circular edge of each of said stator yokes facing said permanent magnet and said pole teeth being disposed to oppose said permanent magnet, one of said stator yokes being integrated with said circular bottom of said depressed mount of said chassis; and (ii) a plurality of armature coils each disposed between a respective one of said pairs of said stator yokes; and (e) a molded portion coupling said rotor bearing to said stator yokes.

2. The motor according to claim 1, further comprising lead-out lines drawn out from said armature coils, and wherein said memory apparatus includes a magnetic head having a center, said rotor has a central axis, said center of said magnetic head and said central axis of said rotor define a straight line, and wherein said lead-out lines drawn out from said armature coils make an angle ($\theta$) of $\pm 30°$ to $\pm 135°$ with said straight line as viewed from said magnetic head.

3. The motor according to claim 2, wherein said angle ($\theta$) is $\pm 30°$ to $\pm 90°$.

4. A method for forming the motor of claim 1, said method comprising:

mounting said stator yokes and said armature coils on one another thereby to form said stator; and mounting said rotor in said stator.

* * * * *